United States Patent [19]
Aral et al.

[11] Patent Number: 5,826,162
[45] Date of Patent: Oct. 20, 1998

[54] LEACHING OF TITANIFEROUS MATERIALS

[75] Inventors: Halil Aral, East Bentleigh; Warren John Bruckard, North Balwyn; David Edward Freeman, North Dandenong; Ian Edward Grey, Melbourne; Martin Richard Houchin, Pascoe Vale; Kenneth John McDonald, Glen Waverly; Graham Jeffrey Sparrow, Vermont South; Kaye Patricia Hart, New South Wales; Harold Robert Harris, Geraldton, all of Australia

[73] Assignee: RGC Mineral Sands Limited, Australia

[21] Appl. No.: 702,653

[22] PCT Filed: Mar. 8, 1995

[86] PCT No.: PCT/AU95/00112

§ 371 Date: Oct. 28, 1996

§ 102(e) Date: Oct. 28, 1996

[87] PCT Pub. No.: WO95/24510

PCT Pub. Date: Sep. 14, 1995

[30] Foreign Application Priority Data

Mar. 8, 1994 [AU] Australia ............... PM4299
Jun. 7, 1994 [AU] Australia ............... PM6104

[51] Int. Cl.$^6$ .............. C01G 43/00; C01F 13/00
[52] U.S. Cl. ............... 423/20; 423/18; 423/82; 423/86
[58] Field of Search ............... 423/18, 82, 86, 423/20

[56] References Cited

U.S. PATENT DOCUMENTS

| | | | |
|---|---|---|---|
| 2,406,577 | 8/1946 | Alessandroni et al. . | |
| 3,922,164 | 11/1975 | Reid et al. | 423/86 |
| 3,976,761 | 8/1976 | Gowes et al. | 423/610 |
| 4,019,898 | 4/1977 | Chen et al. | 423/86 |
| 4,295,878 | 10/1981 | Fensom | 423/69 |
| 4,438,077 | 3/1984 | Tsui . | |
| 5,011,666 | 4/1991 | Chao et al. | 423/82 |
| 5,085,837 | 2/1992 | Chao et al. | 423/82 |
| 5,181,956 | 1/1993 | Chao | 423/20 |
| 5,427,749 | 6/1995 | Hollitt et al. | 423/86 |
| 5,578,109 | 11/1996 | Harris et al. | 423/20 |

FOREIGN PATENT DOCUMENTS

| | | |
|---|---|---|
| A39002/89 | 2/1990 | Australia . |
| A14981/92 | 10/1992 | Australia . |
| A46046/93 | 11/1993 | Australia . |
| 1247372 | 12/1988 | Canada . |
| 0243725 | 11/1987 | European Pat. Off. . |
| 726367 | 3/1955 | United Kingdom . |
| WO91/13180 | 9/1991 | WIPO . |
| WO94/03647 | 2/1994 | WIPO . |
| WO94/04709 | 3/1994 | WIPO . |

Primary Examiner—Edward A. Miller
Attorney, Agent, or Firm—Harness, Dickey & Pierce, P.L.C.

[57] ABSTRACT

A process for facilitating removal of one or more impurities from titaniferous material containing the impurities in a form which is highly soluble in acid. The material is in turn leached with a sulphuric acid solution and with a hydrochloric acid solution in either order. To enhance the susceptibility of the impurities to removal, the hydrochloric acid leach is augmented by one or more of the following: (i) addition of an effective amount of an added chloride salt; (ii) pre-treatment of the titaniferous material with a solution of an effective amount of a carbonate salt, preferably an alkali metal or alkaline earth metal carbonate; and/or (iii) pre-treatment of the titaniferous material with a solution of an effective amount of a hydroxide, preferably an alkali metal or alkaline earth metal hydroxide.

39 Claims, No Drawings

LEACHING OF TITANIFEROUS MATERIALS

FIELD OF THE INVENTION

This invention relates to a process for facilitating the removal of impurities, especially but not only radionuclides such as uranium and thorium and their radionuclide daughters, from titaniferous materials, and is concerned in particular embodiments with the removal of impurities, including especially uranium and thorium, from products formed from weathered or "altered" ilmenite.

BACKGROUND ART

Ilmenite ($FeTiO_3$) and rutile ($TiO_2$) are the major, commercially-important, mineral feedstocks for titanium metal and titanium dioxide production and generally occur together in nature as components of "mineral sands" or "heavy minerals", along with zircon ($ZrSiO_4$) and monazite (($Ce, La, Th)PO_4$). Natural weathering of ilmenite results in partial oxidation of the iron, originally present in ilmenite in the ferrous state ($Fe^{2+}$), to ferric iron ($Fe^{3+}$). To maintain electrical neutrality, some of the oxidised iron must be removed from the ilmenite lattice. This results in a more porous structure with a higher titanium (lower iron) content. Such weathered materials are known as "altered" ilmenites and may have $TiO_2$ contents in excess of 60% $TiO_2$, compared with 52.7% $TiO_2$ in stoichiometric (unaltered) ilmenite. As weathering, or alteration, of the ilmenite proceeds, impurities such as alumino-silicates (clays) are often incorporated into the porous structure as discrete, small grains that reside in the pores of the altered ilmenite. It appears that uranium and thorium can also be incorporated into the ilmenite during this process.

Most of the world's mined ilmenite is used for the production of titanium dioxide pigments for use in the paint and paper industries. Pigment-grade titania (titanium dioxide, $TiO_2$) has been traditionally produced by reacting ilmenite with concentrated sulphuric acid and subsequent processing to produce a $TiO_2$ pigment—the so-called sulphate route. However, this process is becoming increasingly undesirable on environmental grounds due to the large volumes of acidic liquid wastes which it produces. The alternative process—the so-called chloride route—involves reaction with chlorine to produce volatile titanium tetrachloride ($TiCl_4$) and subsequent conversion to $TiO_2$. Unlike the sulphate route, the chloride route is capable of handling feedstocks, such as rutile, which are high in $TiO_2$ content and low in iron and other impurities. Consequently the chloride-route presents fewer environmental problems and has become the preferred method for $TiO_2$ pigment production. Natural rutile supplies are insufficient to meet the world demands of the chloride-route. Thus, there is an increasing need to convert the more-plentiful ilmenites and altered ilmenites (typically 45 to 65% $TiO_2$) to synthetic rutile (containing over 90% $TiO_2$). A number of different processes have been developed to upgrade ilmenite to synthetic rutile, the most widely used, commercially, being the Becher process.

The Becher process involves the following main stages.

1. Reduction, in a rotary kiln, of the iron oxides contained in the ilmenite feed largely to metallic iron, at temperatures in the range 900°–1200° C., using coal as the heat source and the reductant. The principal product is known as reduced ilmenite (RI).
2. Cooling, in an oxygen-free environment, the solids discharging from the reduction kiln.
3. Dry physical separation of the reduced ilmenite and surplus char.
4. Aqueous oxidation (known as aeration) of the reduced ilmenite to convert the metallic iron to iron oxide particles discrete from the $TiO_2$-rich mineral particles.
5. Wet physical separation to remove the iron oxides from the $TiO_2$-rich mineral. Hereinafter the product of this step is referred to as "aerated product".
6. An optional leaching stage to remove a portion of the residual iron and some manganese and magnesium.
7. Washing, dewatering and drying of the synthetic rutile product.

Whether ilmenite is marketed as the raw mineral or as upgraded, value-added, synthetic rutile, producers are being increasingly required to meet more stringent limits for radioactivity levels in their products. To meet the limits requires the removal of uranium and thorium and their radionuclide daughters from the material. The Becher synthetic rutile process does not reduce significantly the levels of uranium and thorium in the product and so there has been an increasing need to develop an economic and effective process for removal of uranium and thorium, and the associated radionuclide daughters, from ilmenite and other titaniferous materials (eg synthetic rutile).

Frequently ilmenite concentrates contain low levels of thorium due to monazite contamination. It is not a purpose of this invention, in its application to radionuclide impurities, to remove macroscopic monazite grains from titaniferous materials, but rather to remove the microscopic uranium and thorium originally incorporated into the ilmenite grains during the weathering process.

U.S. Pat. Nos. 5,011,666 and 5,085,837 disclose a process for removing thorium and uranium, and other impurities, from $TiO_2$ ore by subjecting the ore to two or more leaching treatments, the said leaching treatments alternating between the use of an aqueous solution of mineral acid, preferably hydrochloric acid, and an aqueous solution of an alkali metal carbonate, hydroxide or mixtures thereof, most preferably sodium hydroxide. The acid leach occurs first in the claims of U.S. Pat. No. 5,011,666, and second in U.S. Pat. No. 5,085,837. The leaches may be separated by an intervening filtration and wash. Example III in each patent discloses a three-step leach with hydrochloric acid, then sodium hydroxide, then hydrochloric acid. The NaOH leach is exemplified at concentrations of 20 and 30% (5M and 7.5M respectively), and at a temperature of 160° C. to 210° C. and 8 to 18 atm pressure. These are very high pressures which we consider would be very expensive and perhaps even technically not feasible. The HCl acid leaches are exemplified at 20% (5.5M). Roasting at a temperature of less than about 700° C. prior to the leaching treatment is proposed for some ores. Analytical data in the patent is considered to be by conventional analytical methods such as x-ray fluorescence spectrometry. This technique only measures the concentration of the parent thorium and uranium isotopes in the sample and does not give any indication of the concentration of their radionuclide daughters. Radionuclide measuring techniques (such as gamma-spectroscopy) are required to measure the concentrations of the daughter isotopes.

The present applicant's prior Australian patent application 14981/92 discloses a process for facilitating removal of radionuclides from titaniferous material in which the latter is subjected to a treatment with an aqueous solution of an alkali metal oxide or hydroxide at a solution temperature preferably no greater than 125° C., and thereafter leached with mineral acid, preferably sulphuric acid. It was found that this process did result in the recovery of significant thorium but did not correspondingly reduce radioactivity.

The present applicant's Australian patent application no. 14980/92 discloses a process for treating titaniferous material to remove thorium and/or uranium in which the material is leached with acid with added fluoride.

International Patent Publication WO94/03647 (PCT/AU93/00381), by the present applicant, discloses the discovery that while leaching, and roasting and leaching, treatments (such as those disclosed in AU 14981/92, U.S. Pat. No. 5,085,837 and U.S. Pat. No. 5,011,666) may remove the parent thorium isotope ($^{232}$Th), the radionuclide decay products, or "daughters", in particular $^{228}$Ra and $^{228}$Th, are not removed to the same extent. As a consequence the radioactivity levels of the leached materials are higher than expected from the assay value for the parent isotope and may be too high to meet the radioactivity limit for the product. International Patent Publication WO94/03647 teaches that removal of the parent thorium isotope and its radionuclide daughters occur together when the material is heated (roasted) at a temperature of 1000° C. prior to leaching but then the amount of thorium removed is less than that achieved without heating or after heating at up to 500° C. Only by heating at 1400° C. does the subsequent leaching result in removal of thorium and associated radionuclide daughters together, and to the same extent as when the heating temperatures is 500° C. or lower. However, heating at 1400° C. prior to leaching is not expected to be an economic process.

U.S. Pat. No. 5,181,956 discloses an acid leaching step to remove impurities, including uranium and thorium, from titaniferous ores comprising contacting the ore with an aqueous solution of a mineral acid having a concentration of about 3–30 wt % at a temperature of about 160°–300° C. Again the expectation, based on the teaching of International Patent Application WO94/03647, is that leaching the ore, even at 300° C., may remove the parent thorium isotope but does not remove the radionuclide daughters, and so lower the activity level of the sample, to the degree indicated by the analysis value of the parent thorium isotope.

Optionally, U.S. Pat. No. 5,181,956 discloses that the ore may be given a reductive roast, preferably at 1100°–1300° C., before leaching. No examples of the effect of a reductive roast prior to leaching on the removal of thorium are given in U.S. Pat. No. 5,181,956. While the parent thorium and radionuclide daughters can be expected to be removed to a similar extent after such a reductive roast, current work, as described in examples to this patent, have shown that the extent to which the parent isotope is removed is much less than when the ore is leached without the reductive roast before leaching.

Australian patent 599090 discloses a process for purifying $TiO_2$ ore in which the ore is roasted, eg at 600° C. to 1100° C., with an alkali metal compound, which may be inter alia a carbonate or hydroxide, to convert impurities including thorium and uranium into an acid soluble form, which is then leached with a solution of a non-sulphuric mineral acid, eg hydrochloric acid.

The aforementioned International Patent Publication WO94/03647 further discloses a process for facilitating the removal of impurities, including radionuclides, from titaniferous material which comprises treating the titaniferous material to cause aggregation or concentration of the radionuclides to an extent effective to enhance the accessibility of the radionuclides to subsequent removal. The radionuclides may be uranium and/or thorium and/or one or more of their radionuclide daughters. The treatment preferably includes heating the titaniferous material while contacting it with one or more reagents. Particularly effective reagents, in that they achieved optimum incorporation of the radionuclides, include alkali and alkaline earth borates. The process optionally includes treatment of the heated treated titaniferous material directly with an acid leach, or with an acid leach after aeration, to dissolve the phase incorporating the impurities including the radionuclides and thereby to extract them from the titaniferous material. The titaniferous material used in the process may be, eg, ilmenite or altered ilmenite, reduced ilmenite, or synthetic rutile.

In the preferred treatment, the reagents selected for the treatment are known to melt as a result of a heat treatment and are glass forming agents. They form a liquid phase which disperses onto the surfaces of the titaniferous material, and in so doing, collects and concentrates the impurities including radionuclides and/or one or more daughters. In cooling the titaniferous material prior to acid leaching, the phase containing the radionuclides is thought likely to form a glassy phase containing the radionuclides. From the known solubility of glasses expected to form in the system it is anticipated that the glassy phase would be dissolved during the acid leach. The acid leaches disclosed in the international application are a single hydrochloric acid leach of a least 0.05M, or a sulphuric acid leach followed by a hydrochloric acid leach. In some examples, the single hydrochloric acid leach contains sodium fluoride.

Other disclosures concerned with or embracing radioactivity reduction in heavy mineral concentrates and/or mineral sands ores include International Patent Publications WO92/18985, WO94/04709 and WO94/05015 and Australian Patent Application 44589/93.

DISCLOSURE OF THE INVENTION

A difficulty encountered with the leaching systems disclosed in WO94/03647 is that removal of the radium, a radionuclide decay product or daughter of thorium, tends to be less effective than desired, at least for economically optimum strengths of hydrochloric acid. It is an object of the present invention, in its application to the removal of radionuclide impurities, to at least in part alleviate this problem.

In accordance with a preferred embodiment of the invention, it has now been found that the phase containing the radionuclides formed from titaniferous material according to WO94/03647 can be leached and extracted from the material by leaching systems other than those disclosed previously. These new systems are also likely to be more cost-effective as a result of the lower reagent concentrations generally required for a given level of impurity, especially radionuclide, removal.

In particular, in accordance with one aspect of the invention, titaniferous material containing one or more impurities in a form which is highly soluble in acid is in turn leached with a sulphuric acid solution and with a hydrochloric acid solution in either order, and wherein the hydrochloric acid leach is augmented by one or more of the following:

(i) addition of an effective amount of an added chloride salt;

(ii) pre-treatment of the titaniferous material with a solution of an effective amount of a carbonate salt, preferably an alkali metal or alkaline earth metal carbonate or; and or (iii) pre-treatment of the titaniferous material with a solution of an effective amount of a hydroxide, preferably an alkali metal or alkaline earth metal hydroxide;

whereby to enhance the susceptibility of the impurities to removal.

In another aspect, the invention provides a process for facilitating removal of one or more impurities including radionuclides and their daughters from titaniferous material containing the impurities in a phase formed by contacting a titaniferous material at an elevated temperature with one or more reagents selected to form the phase at the elevated temperature, which phase disperses onto the surfaces of the titaniferous material and incorporates the impurities;

wherein the material is in turn leached with a mineral acid solution and with a hydrochloric acid solution in either order, wherein the hydrochloric acid leach is augmented by a pre-treatment with a solution of an effective amount of an alkali metal hydroxide at a concentration no greater than 0.01M, preferably in the range 0.005 to 0.01M, a temperature in the range ambient to 80° C., and a pressure in the range 1 to 5 atmospheres;

whereby to enhance the susceptibility of the impurities including the radionuclides and their daughters to removal.

By "either order" in case (ii) and (iii) is meant that the sulphuric acid leach may either precede the carbonate or hydroxide pre-treatment or follow the hydrochloric acid leach of the pre-treated titaniferous material.

Of the three principal alternatives at (i), (ii) and (iii), pre-treatment with hydroxide is usually the preferred approach, but this may depend on the overall conditions and on the impurities of particular interest.

In all these alternative systems, the products of the leaches, or treatments, are typically washed and may be dried before the next step. Plural washes may be desirable for each washing step.

EMBODIMENTS OF THE INVENTION

In general, the titaniferous material is selected from the group including ilmenite, altered ilmenite, reduced ilmenite and synthetic rutile. Conveniently, the synthetic rutile may be in the form of aerated product formed by treatment of ilmenite, which treatment includes reduction of iron therein largely to metallic iron and then aqueous oxidation of the metallic iron to form a separable iron oxide. The form of the impurities which is highly soluble in acid may be a phase in which the impurities have been incorporated, for example by the process disclosed in WO94/03647 (PCT/AU93/00381). Especially effective for treatment according to the present invention is a phase formed by contacting a titaniferous material at an elevated temperature, for example during reduction of iron in ilmenite, with one or more reagents selected to form the phase at the elevated temperature which phase disperses onto the surfaces of the titaniferous material and incorporates the impurities. The elevated temperature is preferably in the range 900° to 1200° C., more preferably 1050° C. to 1200° C. Preferred such reagents include glass forming reagents, especially borates such as alkali metal and alkaline earth metal borates. A reagent mixture may be utilised containing two or more such reagents.

In general the impurities removed may be one or more of the group consisting of silicon and/or silica, aluminium and/or alumina, manganese, residual iron, calcium, thorium and uranium. The process is especially useful in the case where the impurities removed include radionuclides such as uranium, thorium and one or more of their radionuclide daughters including radium, for example thorium as $^{232}$Th and its daughters $^{228}$Th and $^{228}$Ra.

The titaniferous material may be treated aerated product (as hereinbefore defined) which has been produced from a Becher process in which the reduction step (1) includes treatment in accordance with a process as disclosed in WO94/03647, eg addition of a reagent to form a phase incorporating impurities including radionuclides for said leaching in accordance with the invention.

Preferred reagents include sodium chloride as the chloride salt, sodium carbonate as the alkali metal carbonate, and sodium hydroxide as the alkali metal hydroxide. In the treatment systems the sulphuric acid may be between 0.1M and 5M, the hydrochloric acid between 0.01 and 3M, the sodium chloride between 0.05 and 5M, the sodium carbonate between 0.01 and 1M, and the sodium hydroxide between 0.001 and 10M, more preferably no greater than 1M. These concentrations refer to the actual aqueous solution which is contacted with the titaniferous material.

Preferably, where the sulphuric acid leach precedes the hydrochloric acid leach, the concentration of sulphuric acid is selected to be in excess to the extent that free acid is present after the leach, whereby to reduce the effective concentration of the hydrochloric acid for optimum impurity removal.

In general, it is found that, where the impurity is thorium and its daughters, overall radionuclide, especially radium, removal and accordingly radioactivity reduction, are enhanced for a given hydrochloric acid concentration, and that specific levels of radionuclide removal and radioactivity reduction can therefore be achieved more economically. It is thought that, possibly, added chloride or pre-treatment with carbonate or hydroxide, may be effective in selectively taking up the radium as acid soluble radium chloride or by forming an acid soluble carbonate or acid soluble oxide/hydroxide, respectively.

The treatment may be carried out with suspensions of the treated titaniferous material at a solids pulp density of between 5 and 70 wt % solids, a temperature ambient to 95° C., a pressure from 1 to 5 atmospheres and for up to 4 hours.

The preferred leaching conditions for the sulphuric acid leach are at temperatures up to 80° C. and a pressure of 1 to 5 atmospheres and for up to 2 hours. The preferred conditions for the hydrochloric acid leach are at temperatures of up to 60° C., a pressure of 1 to 5 atmospheres and leach times of 2 hours, and more preferably greater than 2 minutes but less than 30 minutes at a solids pulp density of 30 wt % solids or higher. The preferred conditions for the sodium hydroxide leach are a temperature in the range ambient up to 80° C., a pressure of 1 to 5 atmospheres, and a leach time up to two hours.

An especially effective process, in terms of optimum radionuclide removal for minimum cost, involves a sulphuric acid leach, preferably 0.5 to 2M, more preferably 1 to 1.5M, followed by a pre-treatment with a dilute alkali hydroxide solution, preferably sodium hydroxide solution, and then a hydrochloric acid leach, preferably 0.05 to 2M. The residue of the sulphuric acid leach is preferably washed, eg with water, before the pre-treatment, and further washes preferably occur after the pre-treatment and after the hydrochloric acid leach. The required concentration of sodium hydroxide is dependent, inter alia, on the effectiveness of the washing step, but a sodium hydroxide concentration as low as 0.001M may be sufficient. The sodium hydroxide concentration is preferably in the range from about 0.005 to 0.05M may suffice, more preferably not above 0.1M, most preferably 0.005 to 0.01M. Duration of the pre-treatment is preferably at least 5 minutes and up to 60 minutes. Despite the multiple steps required in this process, the low concentrations of acid and sodium hydroxide make it overall cost effective, especially given that recycling of reagents can be avoided.

Our understanding of the process at this time, at least in relation to the case where the impurities include thorium radionuclides and related daughter radionuclides including radium, is that the sulphuric acid dissolves thorium and other impurity elements including residual iron (primarily ferrous or ferric but some metallic), but not radium, from the aerated product and that the subsequent washing and sodium hydroxide treatment remove sulphate salts (perhaps by deprotonation) from the sulphuric acid leach residue. These sulphate salts precipitate during the sulphuric acid leach. Removal of the sulphate salts is necessary so that the sulphate levels in the hydrochloric acid leach remain as low as possible in the leach solution, perhaps below a determinable critical level, for effectiveness of this leach. This requirement needs to be kept in mind in providing the leach solution for the hydrochloric acid leach: the sulphate concentration in this solution is preferably maintained as low as possible, eg well below 50 ppm. The radium is thought to precipitate in the sulphuric acid leach as radium sulphate: this salt is not significantly removed in the sodium hydroxide treatment but is modified in a manner effective for it to be extracted during the hydrochloric acid leach, perhaps by the mechanism noted above.

For removing thorium and its radionuclide daughters, the hydrochloric acid leach is preferably limited to a time, determined by observation, beyond which radium removal in the leach is actually diminished. This preferred maximum time will vary according to other conditions but may typically be in the range 10 to 30 minutes.

The invention is further described and illustrated in the following non-limiting examples. All assays reported, except for radium, were determined by x-ray fluorescence spectrometry. Gamma-spectrometry was used to measure the $^{228}$Ra content of the samples and this value is given as the radium assay in the examples. A lowering of the radium assay indicates a lowering of the radioactivity level of the sample.

(ii) hydrochloric acid (1.0, 1.5 or 2.0M) at 40 wt % solids and 30° C. for 10 minutes, or (iii) sulphuric acid (1.25M) at 40 wt % solids and 60° C. for 120 minutes followed by treatment with sodium hydroxide (0.01M) at 40 wt % solids and 25° C. for 30 minutes and then leached with hydrochloric acid (0.2M) at 40 wt % solids and 30° C. for 10 minutes.

Between each step the solids were washed with water.

The results in Table 1 show that a single leach with sulphuric acid removes thorium and impurities such as calcium, iron, manganese, silicon and aluminium but does not remove radium, and so the activity of the sample is not lowered.

The results also show that a single leach with hydrochloric acid removes radium to a greater extent than sulphuric acid but the removal of the other impurities, in particular thorium, is not as efficient, even with an acid strength of 2.0M hydrochloric acid.

Leaching with sulphuric acid followed by a treatment with sodium hydroxide and a leach with hydrochloric acid achieves the best removal of thorium, radium and the impurity elements. The advantage of this system over the single sulphuric acid or hydrochloric acid leaches is that a higher quality product is obtained. Also, the lower hydrochloric acid concentration required after the sulphuric acid leach and sodium hydroxide treatment means that this system is commercially economic and it is considered superior to the single leaching systems specified in the International Patent Publication WO94/03647 (PCT/AU93/00381).

TABLE 1

| Treatment | Th (ppm) | Ra (Bq/g) | CaO (%) | $Fe_2O_3$ (%) | $Mn_3O_4$ (%) | $SiO_2$ (%) | $Al_2O_3$ (%) |
|---|---|---|---|---|---|---|---|
| Aerated product | 458 | 1.03 | 0.21 | 7.20 | 1.11 | 1.48 | 0.98 |
| Leach with 1.0M $H_2SO_4$ | 63 | 1.07 | 0.02 | 2.12 | 0.71 | 1.01 | 0.50 |
| Leach with 1.0M HCl | 162 | 0.43 | 0.05 | 4.33 | 0.81 | 0.90 | 0.61 |
| Leach with 1.5M HCl | 129 | 0.40 | 0.05 | 3.72 | 0.80 | 0.87 | 0.57 |
| Leach with 2.0M HCl | 113 | 0.36 | 0.04 | 3.28 | 0.78 | 0.88 | 0.55 |
| Leach with 1.25M $H_2SO_4$ | 55 | 0.98 | 0.02 | 1.96 | 0.75 | 0.94 | 0.48 |
| Leach with 0.1M NaOH | 55 | n.d. | 0.02 | 2.00 | 0.75 | 0.78 | 0.47 |
| Leach with 0.2M HCl | 55 | 0.33 | 0.02 | 1.95 | 0.74 | 0.74 | 0.45 | n.d. = not determined

EXAMPLE 1

A comparison of the removal of thorium, radium and other impurities from an aerated product, derived from reduced ilmenite made with a borate mineral added during reduction, is made for different leaching systems in this example.

Eneabba North ilmenite as feedstock, was reduced in accordance with the Becher process employing a commercial-size rotary reduction kiln measuring 27.4 m long, refractory lined to give an internal diameter of 2.0 m. During the reduction a calcium borate mineral was added. The reduced ilmenite produced was aerated in a 30 liter laboratory aerator and the oxide produced was removed to obtain the aerated product which was leached.

Samples of the aerated product were leached with (i) sulphuric acid (1.0M) at 40 wt % solids and 60° C. for 120 minutes, or

EXAMPLE 2

The beneficial effect of addition of a borate mineral during reduction of ilmenite on the subsequent removal of thorium and radium, and other impurities by leaching with sulphuric acid/sodium carbonate/hydrochloric acid is shown in this example.

Using Eneabba North ilmenite as feedstock, samples were reduced in accordance with the Becher process employing a commercial-size rotary reduction kiln measuring 27.4 m long, refractory lined to give an internal diameter of 2.0 m. Two samples of reduced ilmenite (RI) were prepared. One was prepared in the normal manner and can be considered as normal run-of-plant RI. The other was produced under similar conditions except that calcium borate as the mineral colemanite was added to the reduction kiln during the production of the RI. The reduced ilmenite samples produced were aerated in the laboratory in a 2 liter glass reactor and the oxides produced were removed to obtain two aerated products.

The aerated products were leached with sulphuric acid (0.5M) at 25 wt % solids and 60° C. for 60 minutes followed by treatment with sodium carbonate (0.1M) at 50 wt % solids and 80° C. for 60 minutes and then a leach with hydrochloric acid (0.2M) at 25 wt % solids and 60° C. for 60 minutes. Between each step the solids were washed with water and dried.

The results in Table 2 indicate that both thorium and radium were removed from the aerated product from the reduced ilmenite sample that contained the borate mineral. However, very little thorium or radium, were removed from the normal run-of-plant sample. It can be seen that significant amounts of iron, manganese, silicon, and aluminium were also removed from the sample with the borate mineral added but not from the normal run-of-plant sample.

followed by treatment with sodium hydroxide (0.01M) at 40 wt % solids and 25° C. for 30 or 60 minutes and then leached with hydrochloric acid (0.4M) at 40 wt % solids and 60° C. for 60 minutes. Between each step the solids were washed with water.

The results in Table 3 are similar to those for Example 2 in that both thorium and radium, and other impurities such as iron, manganese, silicon and aluminium, were removed from the aerated product from the RI sample that had the borate mineral added in reduction but little thorium, radium or other impurities were removed from the normal run-of-plant sample.

These results also indicate the products from the laboratory and pilot plant aerations of RI to which a borate mineral was added have similar leaching properties.

TABLE 2

| Sample | Treatment | Th (ppm) | Ra (Bq/g) | CaO (%) | Fe$_2$O$_3$ (%) | Mn$_3$O$_4$ (%) | SiO$_2$ (%) | Al$_2$O$_3$ (%) |
|---|---|---|---|---|---|---|---|---|
| No borate added | Reduced ilmenite | 354 | 1.51 | 0.02 | 37.0 | 1.36 | 1.37 | 0.99 |
|  | Aerated prodnct | 452 | 1.77 | 0.02 | 5.49 | 1.64 | 1.77 | 1.22 |
|  | Leach witn H$_2$SO$_4$ | 412 | n.d. | 0.02 | 5.07 | 1.58 | 1.72 | 1.19 |
|  | Leach with Na$_2$CO$_3$ | 412 | n.d. | 0.02 | 5.07 | 1.57 | 1.70 | 1.17 |
|  | Leach with HCl | 403 | 1.72 | 0.02 | 4.96 | 1.56 | 1.70 | 1.19 |
| Borate added | Reduced ilmenite | 354 | 1.44 | 0.98 | 36.6 | 1.32 | 1.59 | 0.96 |
|  | Aerated product | 448 | 0.9 | 0.40 | 5.88 | 1.02 | 1.09 | 0.94 |
|  | Leach with H$_2$SO$_4$ | 114 | 0.79 | 0.18 | 2.40 | 0.74 | 0.61 | 0.38 |
|  | Leach with Na$_2$CO$_3$ | n.d. | n.d. | n.d. | n.d. | n.d. | n.d. | n.d. |
|  | Leach with HCl | 114 | 0.25 | 0.18 | 2.25 | 0.74 | 0.38 | 0.38 | n.d. = not determined

EXAMPLE 3

The beneficial effect of addition of a borate mineral during reduction of ilmenite on the subsequent removal of thorium and radium, and other impurities by leaching with sulphuric acid/sodium hydroxide/hydrochloric acid is shown in this example.

Samples of Eneabba North ilmenite were reduced in a similar manner to Example 2. The run-of-plant reduced ilmenite was aerated in the laboratory in a 2 liter glass reactor and the oxides produced were removed to obtain an aerated product. The RI with the colemanite added was aerated in a 160 liter pilot plant aerator and the oxides produced were removed to obtain the aerated product.

The aerated products were leached with sulphuric acid (1.6M) at 40 wt % solids and 60° C. for 60 or 120 minutes

TABLE 3

| Sample | Treatment | Th (ppm) | Ra (Bq/g) | CaO (%) | Fe$_2$O$_3$ (%) | Mn$_3$O$_4$ (%) | SiO$_2$ (%) | Al$_2$O$_3$ (%) |
|---|---|---|---|---|---|---|---|---|
| No borate added | Reduced ilmenite | 383 | 1.62 | 0.08 | 34.5 | 1.14 | 1.50 | 0.98 |
|  | Aerated product | 459 | 1.92 | 0.08 | 4.79 | 1.32 | 1.81 | 1.21 |
|  | Leach with H$_2$SO$_4$ | 377 | n.d. | 0.07 | 3.96 | 1.20 | 1.85 | 1.22 |
|  | Leach with NaOH | 361 | n.d. | 0.07 | 3.91 | 1.19 | 1.84 | 1.23 |
|  | Leach with HCl | 369 | 1.73 | 0.06 | 3.94 | 1.20 | 1.86 | 1.24 |
| Borate added | Reduced ilmenite | 354 | 1.44 | 0.98 | 36.6 | 1.32 | 1.59 | 0.96 |
|  | Aerated product | 465 | 1.0 | 0.52 | 8.26 | 1.07 | 1.17 | 0.90 |
|  | Leach with H$_2$SO$_4$ | 96 | n.d. | 0.17 | 1.50 | 0.72 | 0.63 | 0.32 |
|  | Leach with NaOH | 87 | n.d. | 0.17 | 1.53 | 0.72 | 0.61 | 0.34 |
|  | Leach with HCl | 87 | 0.38 | 0.15 | 1.48 | 0.72 | 0.63 | 0.36 | n.d. = not determined

EXAMPLE 4

Results for leaching with sulphuric acid followed by hydrochloric acid, with and without a pre-treatment with sodium hydroxide before the hydrochloric acid leach are given in this example.

Eneabba North ilmenite as feedstock, was reduced in accordance with the Becher process employing a commercial-size rotary reduction kiln measuring 27.4 m long, refractory lined to give an internal diameter of 2.0 m. During the reduction a calcium borate as the mineral colemanite was added to the kiln. The reduced ilmenite produced was aerated in a 160 liter pilot plant aerator and the oxide produced was removed to obtain the aerated product which was leached.

The aerated product was leached with sulphuric acid (2.0M) at 40 wt % solids and 60° C. for 60 minutes followed by a leach with hydrochloric acid (0.4M) at 40 wt % solids and 60° C. for 60 minutes. The solids were washed with water between leaches.

A separate sample of the aerated product was also leached with sulphuric acid (1.6M) at 40 wt % solids and 60° C. for 60 minutes followed by treatment with sodium hydroxide (0.01M) at 40 wt % solids and 25° C. for 30 minutes and then a leach with hydrochloric acid (0.2M) at 40 wt % solids and 30° C. for 60 minutes. Between each step the solids were washed with water and dried.

The results in Table 4 indicate that thorium and radium, and many of the other impurities in the sample (such as calcium, iron, manganese, silicon and aluminium), were removed from the aerated product by the two leaching systems. However, with the sodium hydroxide treatment between the two acid leaches, the removal of radium in the hydrochloric acid was greater.

As well, another sample of the aerated product was leached twice with hydrochloric acid (0.4M) containing sodium chloride (1M) at 40 wt % solids and 40° C. for 60 minutes, and then with sulphuric acid (2M) at 60 wt % solids and 60° C. for 60 minutes.

The results in Table 5 show that good removal of thorium, radium and impurities were achieved from the aerated product by both leaching routes.

TABLE 5

| Treatment | Th (ppm) | Ra (Bq/g) | CaO (%) | $Fe_2O_3$ (%) | $Mn_3O_4$ (%) | $SiO_2$ (%) | $Al_2O_3$ (%) |
|---|---|---|---|---|---|---|---|
| Aerated product | 465 | 1.0 | 0.52 | 8.26 | 1.07 | 1.27 | 0.96 |
| Leach with $H_2SO_4$ | 143 | n.d. | 0.19 | 2.40 | 0.74 | 0.79 | 0.39 |
| Leach with HCl/NaCl | 97 | 0.9 | 0.16 | 1.74 | 0.73 | 0.73 | 0.36 |
| Leach with HCl/NaCl | 88 | <0.3 | 0.18 | 1.84 | 0.73 | 0.68 | 0.35 |
| Aerated product | 465 | 1.0 | 0.52 | 8.26 | 1.07 | 1.17 | 0.90 |
| Leach with HCl/NaCl | 456 | 0.8 | 0.36 | 5.78 | 0.90 | 1.27 | 0.96 |
| Leach with HCl/NaCl | 474 | 0.4 | 0.22 | 4.18 | 0.78 | 1.20 | 0.59 |
| Leach with $H_2SO_4$ | 95 | 0.3 | 0.17 | 1.57 | 0.73 | 1.16 | 0.36 | n.d. = not determined

TABLE 4

| Treatment | Th (ppm) | Ra (Bq/g) | CaO (%) | $Fe_2O_3$ (%) | $Mn_3O_4$ (%) | $SiO_2$ (%) | $Al_2O_3$ (%) |
|---|---|---|---|---|---|---|---|
| Aerated product | 465 | 1.0 | 0.52 | 8.26 | 1.07 | 1.27 | 0.96 |
| Leach with $H_2SO_4$ | 93 | 0.74 | 0.15 | 2.15 | 0.72 | 0.66 | 0.35 |
| Leach with HCl | 83 | 0.58 | 0.16 | 1.83 | 0.71 | 0.61 | 0.33 |
| Aerated product | 465 | 1.0 | 0.52 | 8.26 | 1.07 | 1.27 | 0.96 |
| Leach with $H_2SO_4$ | 96 | n.d. | 0.17 | 1.50 | 0.72 | 0.63 | 0.32 |
| NaOH treatment | 87 | n.d. | 0.17 | 1.49 | 0.73 | 0.59 | 0.33 |
| Leach with HCl | 87 | 0.36 | 0.16 | 1.45 | 0.72 | 0.63 | 0.35 | n.d. = not determined

EXAMPLE 5

The effect of the addition of sodium chloride to the hydrochloric acid leach is illustrated in this example.

Using Eneabba North ilmenite as feedstock, aerated product was produced in a similar manner to Example 4.

A sample of the aerated product was leached with sulphuric acid (2M) at 60 wt % solids and 60° C. for 60 minutes and then twice with hydrochloric acid (0.4M) containing sodium chloride (1M) at 40 wt % solids and 40° C. for 60 minutes.

EXAMPLE 6

The effect of adding borate minerals during reduction in a laboratory furnace is shown in this example.

Two samples of Eneabba North ilmenite were reduced with coal (−10+5 mm) in a rolling drum in a laboratory roller bed furnace at 1100° C. using a heating profile similar to that in commercial Becher reduction kiln to obtain a reduced ilmenite sample of similar composition to that obtained in commercial plants. Different calcium borate minerals were added to the respective samples before the reduction. The former borate also contained sodium and indeed was the sodium calcium borate mineral ulexite. The reduced ilmenite samples produced were aerated in the laboratory in a 2 liter glass reactor and the oxides produced were removed to obtain two aerated products.

The aerated products were leached with sulphuric acid (1.5M) at 40 wt % solids and 60° C. for 120 minutes followed by treatment with sodium hydroxide (0.01M) at 40 wt % solids and 25° C. for 30 minutes and then leached with hydrochloric acid (0.1 or 0.2M) at 40 wt % solids and 60° C. for 10 minutes. Between each step the solids were washed with water.

The results in Table 6 show that good removal of thorium, radium and other impurities were achieved from RI with these two borate minerals added in reduction. Also the low hydrochloric acid concentrations used to achieve the final removal of impurities should be noted. These concentrations are much lower than those specified in International Patent Application WO94/03647 (PCT/AU93/00381).

The results in Table 7 show that good removal of thorium, radium and other impurities was achieved from the RI samples with the two borate minerals added during reduction in a commercial kiln.

TABLE 6

|  | Treatment | Th (ppm) | Ra (Bq/g) | CaO (%) | $Fe_2O_3$ (%) | $Mn_3O_4$ (%) | $SiO_2$ (%) | $Al_2O_3$ (%) |
| --- | --- | --- | --- | --- | --- | --- | --- | --- |
| First Sample | Reduced ilmenite | 375 | 1.34 | 0.45 | 36.2 | 1.12 | 2.07 | 1.15 |
|  | Aerated product | 405 | 1.25 | 0.23 | 4.39 | 1.08 | 2.05 | 1.39 |
|  | Leach with $H_2SO_4$ | 101 | 1.29 | 0.02 | 0.96 | 0.40 | 1.86 | 0.75 |
|  | Leach with NaOH | 101 | 1.23 | 0.02 | 0.89 | 0.40 | 1.68 | 0.72 |
|  | Leach with 0.1M HCl | 109 | 0.37 | 0.02 | 0.93 | 0.40 | 1.64 | 0.73 |
|  | Leach with 0.2M HCl | 109 | 0.31 | 0.02 | 0.92 | 0.40 | 1.77 | 0.78 |
| Second Sample | Reduced ilmenite | 373 | 1.38 | 0.44 | 36.0 | 1.33 | 2.11 | 1.16 |
|  | Aerated product | 388 | 1.08 | 0.15 | 4.74 | 1.12 | 2.06 | 1.36 |
|  | Leach with $H_2SO_4$ | 109 | 1.05 | 0.01 | 1.72 | 0.51 | 1.85 | 1.02 |
|  | Leach with NaOH | 109 | 1.02 | 0.02 | 1.68 | 0.52 | 1.84 | 1.04 |
|  | Leach with 0.1M HCl | 109 | 0.41 | 0.01 | 1.53 | 0.51 | 1.70 | 0.99 |
|  | Leach with 0.2M HCl | 109 | 0.36 | 0.01 | 1.53 | 0.50 | 1.77 | 1.08 |

EXAMPLE 7

The effect of adding borate minerals to a commercial reduction kiln is shown in this example.

Eneabba North ilmenite as feedstock, was reduced in accordance with the Becher process employing a commercial-size rotary reduction kiln measuring 27.4 m long, refractory lined to give an internal diameter of 2.0 m. During the reduction different calcium borate minerals, the same as those employed in Example 6, were added to the kiln during successive time periods. The reduced ilmenite produced during the first period was aerated in a 160 liter pilot plant aerator, while the reduced ilmenite produced during the second period was aerated in a 30 liter laboratory aerator. The oxide produced was removed to obtain the aerated products which were leached.

The aerated products were leached with sulphuric acid (1.6 or 1.25M, respectively) at 40 wt % solids and 60° C. for 60 minutes followed by treatment with sodium hydroxide (0.01M) at 40 wt % solids and 25° C. for 30 minutes and then leached with hydrochloric acid (0.2M) at 40 wt % solids and 60° C. for 10 minutes. Between each step the solids were washed with water.

TABLE 7

|  | Treatment | Th (ppm) | Ra (Bq/g) | CaO (%) | $Fe_2O_3$ (%) | $Mn_3O_4$ (%) | $SiO_2$ (%) | $Al_2O_3$ (%) |
| --- | --- | --- | --- | --- | --- | --- | --- | --- |
| First Period | Aerated product | 465 | 1.00 | 0.52 | 8.26 | 1.07 | 1.27 | 0.96 |
|  | Leach with $H_2SO_4$ | 96 | n.d. | 0.17 | 1.50 | 0.72 | 0.63 | 0.32 |
|  | Leach with NaOH | 87 | n.d. | 0.17 | 1.49 | 0.73 | 0.59 | 0.33 |
|  | Leach with HCl | 87 | 0.28 | 0.16 | 1.55 | 0.73 | 0.64 | 0.36 |
| Second Period | Aerated product | 458 | 1.03 | 0.21 | 7.20 | 1.11 | 1.48 | 0.98 |
|  | Leach with $H_2SO_4$ | 63 | n.d. | 0.01 | 1.90 | 0.74 | 0.97 | 0.51 |
|  | Leach with NaOH | 63 | n.d. | 0.02 | 1.83 | 0.74 | 0.87 | 0.48 |
|  | Leach with HCl | 63 | 0.20 | 0.01 | 1.80 | 0.73 | 0.83 | 0.48 | n.d. = not determined

EXAMPLE 8

The requirement for an excess sulphuric acid concentration to achieve good thorium removal is illustrated in this example.

Eneabba North ilmenite as feedstock, was reduced in accordance with the Becher process employing a commercial-size rotary reduction kiln measuring 27.4 m long, refractory lined to give an internal diameter of 2.0 m. During the reduction a calcium borate mineral was added. The reduced ilmenite produced was aerated in a 60 cubic meter plant aerator and the oxide produced was removed to obtain the aerated product which was leached.

Samples of the aerated product were leached with sulphuric acid (0.6 or 1.0M) at 40 wt % solids and 60° C. for 120 minutes followed by treatment with sodium hydroxide (0.03M) at 40 wt % solids and 25° C. for 30 minutes and then leached with hydrochloric acid (0.1 or 0.4M) at 40 wt % solids and 60° C. for 5 or 30 minutes. Between each step the solids were washed with water.

The results in Table 8 show that much less thorium was removed with 0.6M sulphuric acid compared with 1.0M sulphuric acid. The free acid levels after the leaches were 0.07M and 0.23M, respectively. This result indicates that an excess sulphuric acid of at least 0.2M (20 g/L sulphuric acid) is required to obtain a satisfactory removal of thorium in the sulphuric acid leach. The concentration to be used depends on the impurity levels in the aerated product, particularly the iron content.

The results in Table 8 also indicate that when insufficient sulphuric acid is used, a higher hydrochloric acid level is necessary for similar results. The results show that a hydrochloric acid concentration of 0.1M is sufficient to remove radium after a sulphuric acid leach with 0.2M acid excess.

aerator, while the reduced ilmenite produced in the second period was aerated in a 60 cubic meter plant aerator. The oxide produced was removed to obtain the aerated products which were leached.

The aerated product from RI from the first period was leached with sulphuric acid (1.6M) at 40 wt % solids and 60° C. for 60 minutes followed by treatment with sodium hydroxide (0.01M) at 40 wt % solids and 25° C. for 30 minutes and then leached with hydrochloric acid (0.2M) at 40 wt % solids and 30° C. for 2, 5, 10, 60 and 120 minutes. Between each step the solids were washed with water.

The aerated product from RI from the second period was leached at 15 wt % solids, instead of 40 wt % solids, with sulphuric acid (1.0M) at 60° C. for 120 minutes followed by

TABLE 8

| Treatment | Th (ppm) | Ra (Bq/g) | CaO (%) | $Fe_2O_3$ (%) | $Mn_3O_4$ (%) | $SiO_2$ (%) | $Al_2O_3$ (%) |
|---|---|---|---|---|---|---|---|
| Aerated product | 447 | 0.97 | 0.20 | 8.55 | 1.36 | 1.24 | 0.95 |
| Leach with 0.6M $H_2SO_4$ | 265 | n.d. | 0.02 | 3.94 | 0.86 | 0.82 | 0.51 |
| Leach with NaOH | 257 | n.d. | 0.03 | 3.91 | 0.86 | 0.70 | 0.48 |
| Leach with 0.1M HCl for 5 min | 232 | 0.34 | 0.02 | 3.81 | 0.86 | 0.68 | 0.48 |
| Aerated product | 447 | 0.97 | 0.20 | 8.55 | 1.36 | 1.24 | 0.95 |
| Leach with 0.6M $H_2SO_4$ | 249 | n.d. | 0.02 | 3.79 | 0.86 | 0.84 | 0.48 |
| Leach with NaOH | 249 | n.d. | 0.02 | 3.78 | 0.85 | 0.69 | 0.49 |
| Leach with 0.4M HCl for 30 min | 133 | 0.27 | 0.02 | 3.61 | 0.85 | 0.64 | 0.45 |
| Aerated product | 447 | 0.97 | 0.20 | 8.55 | 1.36 | 1.24 | 0.95 |
| Leach with 1.0M $H_2SO_4$ | 59 | n.d. | 0.02 | 2.68 | 0.85 | 0.75 | 0.43 |
| Leach with NaOH | 59 | n.d. | 0.02 | 2.53 | 0.84 | 0.48 | 0.43 |
| Leach with 0.1M HCl for 30 min | 67 | 0.25 | 0.02 | 2.48 | 0.84 | 0.44 | 0.43 |
| Aerated product | 447 | 0.97 | 0.20 | 8.55 | 1.36 | 1.24 | 0.95 |
| Leach with 1.0M $H_2SO_4$ | 67 | n.d. | 0.02 | 2.51 | 0.84 | 0.73 | 0.45 |
| Leach witn NaOH | 67 | n.d. | 0.02 | 2.50 | 0.85 | 0.49 | 0.42 |
| Leach with 0.4M HCl for 5 min | 59 | 0.24 | 0.02 | 2.49 | 0.85 | 0.49 | 0.43 | n.d. = not determined

EXAMPLE 9

The effect of the hydrochloric acid leach time and the solids pulp density of the leaches on radium removal is shown in this example.

Eneabba North ilmenite as feedstock, was reduced in accordance with the Becher process employing a commercial-size rotary reduction kiln measuring 27.4 m long, refractory lined to give an internal diameter of 2.0 m. During the reduction a calcium borate was added to the kiln during each of two periods. The reduced ilmenite produced during the first period was aerated in a 160 liter pilot plant treatment with sodium hydroxide (0.03M) at 25° C. for 30 minutes and then leached with hydrochloric acid (0.05M) at 30° C. for 10 and 120 minutes, and 24 hours. Between each step the solids were washed with water. (0.05M hydrochloric acid was used so that the amount of acid to weight of solids was the same as for a 40 wt % solids leach.)

The results in Table 9 show that, for leaches at 40 wt % solids, the amount of radium removed in the hydrochloric acid leach was not as great for leach times of 60 minutes or longer. However, for leaches at lower solids pulp density, this effect of time on radium removal was not evident.

TABLE 9

| Solids density | Treatment | Th (ppm) | Ra (Bq/g) | CaO (%) | $Fe_2O_3$ (%) | $Mn_3O_4$ (%) | $SiO_2$ (%) | $Al_2O_3$ (%) |
|---|---|---|---|---|---|---|---|---|
| 40 wt % solids | Aerated Product | 465 | 1.00 | 0.52 | 8.26 | 1.07 | 1.27 | 0.96 |
| | Leach with $H_2SO_4$ | 96 | n.d. | 0.17 | 1.50 | 0.72 | 0.63 | 0.32 |
| | Leach with NaOH | 87 | n.d. | 0.17 | 1.49 | 0.73 | 0.59 | 0.33 |
| | Leach with HCl for 2 min | 87 | 0.31 | 0.16 | 1.46 | 0.72 | 0.59 | 0.35 |
| | Leach with HCl for 5 min | 87 | 0.30 | 0.16 | 1.54 | 0.72 | 0.60 | 0.35 |
| | Leach with HCl for 10 min | 87 | 0.28 | 0.16 | 1.55 | 0.73 | 0.64 | 0.36 |
| | Leach with HCl for 60 min | 87 | 0.36 | 0.16 | 1.45 | 0.72 | 0.63 | 0.35 |
| | Leach with HCl for 120 min | 87 | 0.40 | 0.16 | 1.47 | 0.71 | 0.58 | 0.35 |
| 15 wt % solids | Aerated product | 447 | 0.97 | 0.20 | 8.55 | 1.36 | 1.24 | 0.95 |
| | Leach with $H_2SO_4$ | 72 | n.d. | 0.02 | 2.75 | 0.84 | 0.75 | 0.44 |
| | Leach with NaOH | 64 | n.d. | 0.02 | 2.53 | 0.80 | 0.48 | 0.43 |
| | Leach with HCl for 10 min | 56 | 0.23 | 0.02 | 2.55 | 0.82 | 0.51 | 0.47 |
| | Leach with HCl for 120 min | 64 | 0.22 | 0.02 | 2.57 | 0.83 | 0.50 | 0.45 |
| | Leach with HCl for 24 hours | 64 | 0.21 | 0.02 | 2.29 | 0.81 | 0.54 | 0.46 | n.d. = not determined

EXAMPLE 10

The detrimental effect of sulphate ions in the hydrochloric acid leach on radium removal is shown in this example. In practice the impurity sulphate ions may be present as a result of inefficient washing after the sulphuric acid leach or the sodium hydroxide treatment or be present in the water used to make up the hydrochloric acid.

Using Eneabba North ilmenite as feedstock, an aerated product was produced in a similar manner to Example 1.

Samples of the aerated product from RI were leached with sulphuric acid (1.25M) at 40 wt % solids and 60° C. for 120 minutes followed by treatment with sodium hydroxide (0.01M) at 40 wt % solids and 25° C. for 30 minutes and then leached with hydrochloric acid (0.2M) at 40 wt % solids and 30° C. for 10, or 30 minutes. The hydrochloric acid leaches were carried out with additions of sodium sulphate corresponding to 0, 50 or 100 ppm $SO_4$ in the leach liquor. Between each step the solids were washed with water.

The results in Table 10 clearly show the poorer radium removal when sulphate ions are present in the hydrochloric acid leach. The results also indicate that a hydrochloric leaching time of up to 30 minutes is advantageous.

TABLE 10

| Sulphate added | Treatment | Th (ppm) | Ra (Bq/g) | CaO (%) | $Fe_2O_3$ (%) | $Mn_3O_4$ (%) | $SiO_2$ (%) | $Al_2O_3$ (%) |
|---|---|---|---|---|---|---|---|---|
| | Aerated Product | 458 | 1.03 | 0.21 | 7.20 | 1.11 | 1.48 | 0.98 |
| | Leach with $H_2SO_4$ | 63 | 1.07 | 0.01 | 1.90 | 0.74 | 0.97 | 0.51 |
| | Leach with NaOH | 63 | n.d. | 0.02 | 1.83 | 0.74 | 0.87 | 0.48 |
| 100 ppm $SO_4$ | Leach with HCl for 10 min | 63 | 0.79 | 0.01 | 1.80 | 0.73 | 0.83 | 0.48 |
| 50 ppm $SO_4$ | Leach with HCl for 10 min | 55 | 0.63 | 0.02 | 1.83 | 0.73 | 0.86 | 0.48 |
| 0 ppm $SO_4$ | Leach with HCl for 10 min | 55 | 0.20 | 0.01 | 1.82 | 0.74 | 0.83 | 0.48 |
| | Aerated product | 458 | 1.03 | 0.21 | 7.20 | 1.11 | 1.48 | 0.98 |
| | Leach with $H_2SO_4$ | 55 | 1.07 | 0.02 | 2.07 | 0.73 | 0.94 | 0.46 |
| | Leach with NaOH | 55 | n.d. | 0.02 | 1.93 | 0.75 | 0.83 | 0.48 |
| 100 ppm $SO_4$ | Leach with HCl for 30 min | 55 | 1.15 | 0.01 | 1.86 | 0.73 | 0.81 | 0.47 |
| 50 ppm $SO_4$ | Leach with HCl for 30 min | 55 | 0.86 | 0.01 | 1.81 | 0.74 | 0.80 | 0.47 |
| 0 ppm $SO_4$ | Leach with HCl for 30 min | 55 | 0.28 | 0.01 | 1.90 | 0.73 | 0.78 | 0.47 | n.d. = not determined

Throughout this specification and the claims which follow, unless the context requires otherwise, the word "comprise", or variations such as "comprises" or "comprising", will be understood to imply the inclusion of a stated integer or group of integers but not the exclusion of any other integer or group of integers.

We claim:

1. In a process for removing one or more radionuclides including one or more radionuclide decay products from titaniferous material, said material
    (i) being an aerated product or synthetic rutile, and
    (ii) containing said radionuclides in a form which is highly soluble in acid,
the process comprising leaching said material in a step-wise manner with sulphuric acid solution and with hydrochloric acid solution in either order, the improvement wherein the hydrochloric acid leach is enhanced for removal of one or more of said radionuclide decay products by pre-treatment of said material with a solution of an effective amount of a hydroxide.

2. The process of claim 1, wherein the radionuclide decay products include radium.

3. In a process for removing one or more radionuclides and daughters thereof from titaniferous material, said material
    (i) being an aerated product or a synthetic rutile, and
    (ii) containing the radionuclides and in a phase which is highly soluble in acid, said phase being formed by contacting the titaniferous material at an elevated temperature with one or more reagents selected to form the phase at the elevated temperature, and which phase disperses onto the surfaces of the titaniferous material and incorporates the radionuclides and daughters thereof,
the process comprising leaching said material in a step-wise manner with sulphuric acid solution and with hydrochloric acid solution in either order, the improvement wherein the hydrochloric acid leach is enhanced for removal of one or more of said daughters by pre-treatment of said material with a solution of an effective amount of an alkaline metal hydroxide at a concentration no greater than about 0.1M, the temperature in the range ambient to about 80° C., and a pressure in the range from about 1 to about 5 atmospheres.

4. The process of claim 3, wherein the daughters include radium.

5. The process of claim 1, wherein the leach with sulphuric acid solution precedes the leach with hydrochloric acid solution.

6. The process of claim 3, wherein the leach with sulphuric acid solution precedes the leach with hydrochloric acid solution.

7. In a process for removing one or more radionuclide decay products from titaniferous material, said material
    (i) being an aerated product or synthetic rutile, and
    (ii) containing said radionuclide decay products in a form which is highly soluble in acid,
the process comprising leaching said material in a step-wise manner, with sulphuric acid solution and with hydrochloric acid solution, the improvement wherein the hydrochloric acid leach is augmented by pre-treatment of said material with a solution of an effective amount of a hydroxide thereby to modify, and facilitate removal by hydrochloric acid leaching of, sulphate salts of the decay products, which salts are formed during the sulphuric acid leach.

8. In a process for removing radium from titaniferous material, said material
    (i) being an aerated product or synthetic rutile, and
    (ii) containing said radium in a form which is highly soluble in acid,
the process comprising leaching said material in a step-wise manner with sulphuric acid solution and with hydrochloric acid solution, the improvement wherein the hydrochloric acid leach is augmented by pre-treatment of said material with a solution of an effective amount of a hydroxide thereby to modify, and facilitate removal by hydrochloric acid leaching of, radium sulphate salts formed during the sulphuric acid leach.

9. A process according to claim 1 wherein the products of each leach and of the augmenting treatment are washed before the next step.

10. A process according to claim 1 wherein the form of the radionuclides which is highly soluble in acid is a phase in which the radionuclides have been incorporated.

11. A process according to claim 10 wherein said phase is a phase formed by contacting a titaniferous material at an elevated temperature with one or more reagents selected to form the phase at the elevated temperature, which phase disperses onto the surfaces of the titaniferous material and incorporates the radionuclides.

12. A process according to claim 11 wherein said contacting at an elevated temperature is during reduction of iron in the titaniferous material.

13. A process according to claim 11 wherein said reagents include glass forming reagents.

14. A process according to claim 13 wherein the reagent is selected from alkali metal and alkaline earth metal borates.

15. A process according to claim 11 wherein said elevated temperature is in the range from about 900° C. to about 1200° C.

16. A process according to claim 15 wherein said elevated temperature is in the range from about 1050° C. to about 1200° C.

17. A process according to claim 1 wherein the concentrations of the reagents are selected from the following, as appropriate, with reference to an aqueous solution which is contacted with the titaniferous material: sulphuric acid 0.1M to 5M; hydrochloric acid 0.01 to 3M; sodium hydroxide 0.001 to 10M.

18. A process according to claim 1 wherein the radionuclides include thorium and/or uranium and one or more of their radionuclide daughters including radium.

19. A process according to claim 18, wherein the radionuclide is $^{232}$Th and the daughters include $^{228}$Th and 228Ra.

20. A process according to claim 18 comprising a sulphuric acid leach for removal of thorium, uranium and optionally one or more non-radionuclide impurities, followed by a pre-treatment with a dilute alkali hydroxide solution to treat residual sulphates and then a hydrochloric acid leach for removal of radium.

21. A process according to claim 20 wherein the concentration of sodium hydroxide is no greater than about 0.1M, the temperature of the NaOH solution during said pre-treatment is in the range ambient to about 90° C., and the pressure is in the range from about 1 to about 5 atmospheres.

22. A process according to claim 20 wherein the concentration of sodium hydroxide is in the range from about 0.005 to about 0.01M.

23. A process according to claim 20, wherein the hydrochloric acid leach is for a period limited so as to optimise radium removal.

24. A process according to claim 23 wherein the period is a maximum of about 30 minutes.

25. A process according to claim 20 wherein the alkali hydroxide pre-treatment, and any subsequent wash, and the hydrochloric acid solution are controlled to minimise the concentration of sulphate ions in the latter during the hydrochloric acid leach, effective to optimise radium removal.

26. A process according to claim 1 wherein the titaniferous material is selected from the group including ilmenite, altered ilmenite, reduced ilmenite and synthetic rutile.

27. A process according to claim 1 wherein said titaniferous material is synthetic rutile in the form of aerated product formed by treatment of ilmenite, which treatment includes reduction of iron therein largely to metallic iron and then aqueous oxidation of the metallic iron to form a separable iron oxide.

28. A process according to claim 1 wherein impurities comprising one or more of the group consisting of silicon and/or silica, aluminum and/or alumina, manganese, residual iron and calcium are also removed.

29. A process according to claim 3 wherein the concentration of alkali metal hydroxide is in the range from about 0.005 to about 0.01M.

30. A process according to claim 3 wherein the products of each leach and of the augmenting treatment are washed before the next step.

31. A process according to claim 3 wherein the titaniferous material is selected from the group including ilmenite, altered ilmenite, reduced ilmenite and synthetic rutile.

32. A process according to claim 3 wherein said contacting at an elevated temperature is during reduction of iron in the titaniferous material.

33. A process according to claim 32 wherein said titaniferous material is synthetic rutile in the form of aerated product formed by treatment of ilmenite, which treatment includes said reduction of iron therein largely to metallic iron and then aqueous oxidation of the metallic iron to form a separable iron oxide.

34. A process according to claim 32 wherein said reagents include glass forming reagents.

35. A process according to claim 34 wherein the reagent is selected from alkali metal and alkaline earth metal borates.

36. A process according to claim 3 wherein said elevated temperature is in the range from about 900° C. to about 1200° C.

37. A process according to claim 36 wherein said elevated temperature is in the range from about 1050° C. to about 1200° C.

38. A process according to claim 3 wherein said alkali metal hydroxide is sodium hydroxide.

39. A process according to claim 3 wherein the radionuclide is $^{232}$Th and the daughters include $^{228}$TH and $^{228}$Ra.

* * * * *

UNITED STATES PATENT AND TRADEMARK OFFICE
CERTIFICATE OF CORRECTION

PATENT NO. : 5,826,162
DATED : October 20, 1998
INVENTOR(S) : Halil Aral, et al.

It is certified that error appears in the above-indentified patent and that said Letters Patent is hereby corrected as shown below:

Col. 12, line 3 of TABLE 5      "1.27" should be --1.17--
and "0.96" should be --0.90--

Col. 19, line 39 (Claim 19)      "228Ra" should be --$^{228}$Ra--

Signed and Sealed this

Twentieth Day of April, 1999

Attest:

Q. TODD DICKINSON

*Attesting Officer*      *Acting Commissioner of Patents and Trademarks*